(12) United States Patent
Kataoka

(10) Patent No.: US 12,705,772 B2
(45) Date of Patent: Aug. 11, 2026

(54) THREE-DIMENSIONAL SHAPE MEASURING SYSTEM

(71) Applicant: OKUMA Corporation, Niwa-gun (JP)

(72) Inventor: Akihito Kataoka, Aichi (JP)

(73) Assignee: OKUMA CORPORATION, Niwa-Gun (JP)

( * ) Notice: Subject to any disclaimer, the term of this patent is extended or adjusted under 35 U.S.C. 154(b) by 282 days.

(21) Appl. No.: 18/483,914

(22) Filed: Oct. 10, 2023

(65) Prior Publication Data

US 2024/0127467 A1 Apr. 18, 2024

(30) Foreign Application Priority Data

Oct. 14, 2022 (JP) ................................ 2022-165592

(51) Int. Cl.

*G06T 7/579* (2017.01)
*B23Q 17/24* (2006.01)
*G01B 11/24* (2006.01)
*G06T 7/11* (2017.01)

(52) U.S. Cl.

CPC ................ *G06T 7/579* (2017.01); *G06T 7/11* (2017.01); *G06T 2200/21* (2013.01); *G06T 2207/20132* (2013.01); *G06T 2207/30164* (2013.01)

(58) Field of Classification Search

CPC ....... G06T 7/579; G06T 7/11; G06T 2200/21; G06T 2207/20132; G06T 2207/30164; G01B 11/24; B23Q 17/2452

See application file for complete search history.

(56) References Cited

U.S. PATENT DOCUMENTS

2008/0284864 A1 11/2008 Kotake et al.
2011/0255771 A1* 10/2011 Kwon .................. G06T 7/0006 382/145
2012/0070055 A1* 3/2012 Liu ...................... G06T 7/0016 382/131

(Continued)

FOREIGN PATENT DOCUMENTS

JP H04259807 A 9/1992
JP 2008046750 A 2/2008

(Continued)

OTHER PUBLICATIONS

JPO Notice of Reasons for Refusal for corresponding JP Application No. 2022-165592; issued Jan. 27, 2026.

*Primary Examiner* — Amandeep Saini
*Assistant Examiner* — Andrew S Budisalich
(74) *Attorney, Agent, or Firm* — CANTOR COLBURN LLP

(57) ABSTRACT

A three-dimensional shape measuring system includes a controller and a camera which images a target object to acquire a base image, in which the controller is configured to previously store three-dimensional shape data for a plurality of known structures, identify at least one structure from the plurality of known structure as at least one reference structure, compute at least one extruded region formed by extruding the at least one reference structure along a predetermined extruding direction based on the three-dimensional shape data, crop out a part of the base image to generate a computational image based on the at least one extruded region and the base image, and measure a shape of the target object based on the computational image.

6 Claims, 11 Drawing Sheets

(56) References Cited

U.S. PATENT DOCUMENTS

| | | | | |
|---|---|---|---|---|
| 2017/0370706 | A1 | 12/2017 | Nakatsukasa | |
| 2018/0172436 | A1* | 6/2018 | Isei | G01B 5/003 |
| 2019/0329496 | A1 | 10/2019 | Vasa et al. | |
| 2020/0250796 | A1* | 8/2020 | Tao | G06T 7/13 |
| 2021/0104071 | A1* | 4/2021 | Shao | G06T 7/97 |
| 2022/0066468 | A1* | 3/2022 | Iwamoto | G05D 1/0234 |
| 2022/0207743 | A1* | 6/2022 | Toporek | G06T 7/70 |
| 2022/0344124 | A1* | 10/2022 | Chiba | G06T 7/70 |
| 2022/0357153 | A1* | 11/2022 | Konishi | B25J 9/1692 |
| 2023/0305515 | A1* | 9/2023 | Niikura | G05B 19/409 |

FOREIGN PATENT DOCUMENTS

| | | | | | |
|---|---|---|---|---|---|
| JP | 2008076107 | A | | 4/2008 | |
| JP | 2018004277 | A | | 1/2018 | |
| JP | 2018114935 | A | | 7/2018 | |
| JP | 2023022517 | A | * | 2/2023 | G06T 7/001 |

* cited by examiner

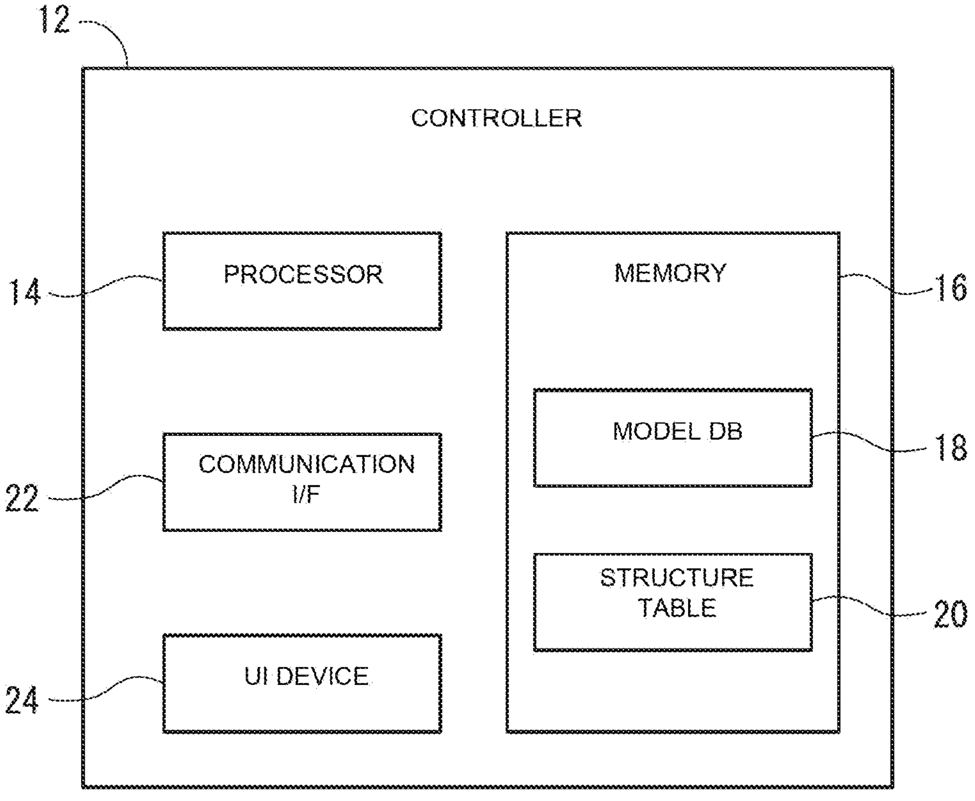
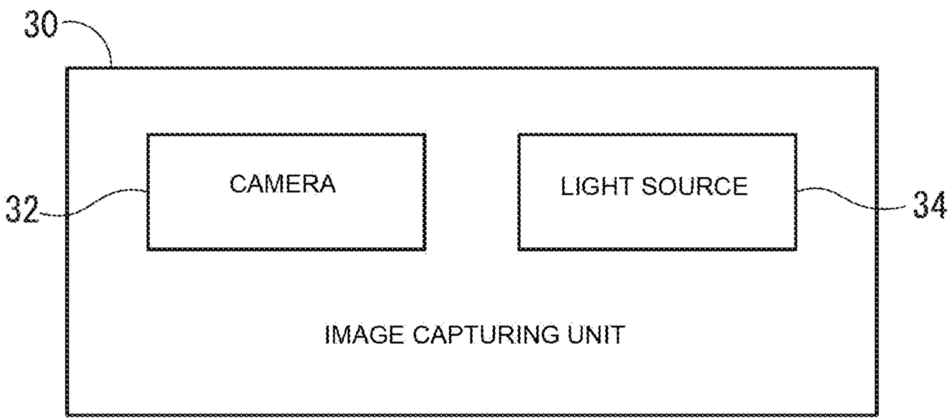
FIG. 2

20

| STRUCTURE | EXTRUDING DIRECTION | CUTTING APPLICABILITY |
| --- | --- | --- |
| TABLE | ** AXIS | APPLICABLE |
| VISE | ** AXIS | APPLICABLE |
| SPINDLE HEAD | TOOL ROTATION AXIS | UNAPPLICABLE |
| COVER | SPECIFIED BY OPERATOR | NULL |
| FASTENING BED | ** AXIS | UNAPPLICABLE |
| ⋮ | ⋮ | ⋮ |

| STRUCTURE | EXTRUDING DIRECTION | CUTTING APPLICABILITY |
| --- | --- | --- |
| WORK SPINDLE | WORK ROTATION AXIS | APPLICABLE |
| TURRET | ** AXIS / ** AXIS / ** AXIS / ** AXIS / | UNAPPLICABLE |
| FASTENING BED | ** AXIS | UNAPPLICABLE |
| ⋮ | ⋮ | ⋮ |

FIG. 8B

THREE-DIMENSIONAL SHAPE MEASURING SYSTEM

CROSS REFERENCE TO RELATED APPLICATION

This application claims priority to Japanese Patent Application No. 2022-165592 filed on Oct. 14, 2022, which is incorporated herein by reference in its entirety including the specification, claims, drawings, and abstract.

TECHNICAL FIELD

The present specification discloses a three-dimensional shape measuring system which measures a shape of a target object based on a captured image of the target object.

BACKGROUND

Conventionally, techniques for measuring the shape of an object based on a captured image of the object have been known.

For example, Patent Document 1 (JP 2018-004277 A) discloses a technique of emitting patterned light onto a target object placed on a stage to capture an image of the target object using a camera and generating point cloud data representing a three-dimensional shape of the target object based on the captured image. Here, in general, images captured by a camera include undesired regions other than the target object. Generation of point cloud data based on the images containing such undesired regions not only increases an amount of computation but also increases a possibility that the shape of the target object may be erroneously measured. To avoid this, in Patent Document 1, region information for distinguishing between an effective region and an ineffective region in a space above the stage is previously stored, and point cloud data are generated only for the effective region. In this way, the amount of computation needed to measure the shape of the target object can be reduced.

CITATION LIST

Patent Literature

Patent Document 1: JP 2018-004277 A

However, in the technique of Patent Document 1, because the effective region is unchangeable, the use of this technique is limited to a case where sizes of target objects and positions of target objects relative to the camera are always contained in a fixed range. On the other hand, there are three-dimensional shape measuring systems in which the size and position of a target object may be changed as appropriate. For example, there may be a case where such three-dimensional shape measuring systems are incorporated in machine tools. In this case, the three-dimensional shape measuring systems measure the shape of a target object such as a workpiece or a tool, for example. In the machine tools, various types of products are machined. Therefore, positions and sizes of the workpiece, the tool, and other components are greatly varied every time the type of the product to be machined is changed. Further, even during a period of machining one workpiece, the positions and sizes of the workpiece, the tool, and other components are varied depending on progress of machining operation. In this case, the technique of Patent Document 1 cannot be utilized, and it has been almost impossible to remove undesired regions from a captured image of a target object, such as a workpiece.

Under the circumstances, the present specification discloses a three-dimensional shape measuring system capable of easily removing undesired data from a captured image of a target object even though a position and a size of the target object are changed.

SUMMARY

A three-dimensional shape measuring system disclosed herein includes a camera configured to image a target object to acquire a base image thereof, and a controller configured to measure a shape of the target object, in which the controller is further configured to previously store three-dimensional shape data for a plurality of known structures, identify at least one structure from the plurality of known structures as at least one reference structure, compute, based on the three-dimensional shape data, at least one extruded region formed by extruding the at least one reference structure along at least one extruding direction respectively defined for the at least one reference structure in advance, crop out a part of the base image to generate a computational image based on the at least one extruded region and the base image, and measure the shape of the target object based on the computational image.

In this case, the at least one reference structure may include a structure which is moved in conjunction with the target object, or which is changed in position and orientation in conjunction with the target object.

In addition, the controller may be configured to instruct the camera to capture an image of the target object under mutually-different imaging conditions in order to acquire a plurality of base images, and generate the computational image for each of the plurality of base images, and the controller may be further configured to maintain both the at least one reference structure and the at least one extruded region unchanged even when the imaging condition for the base image is changed, the at least one reference structure and the at least one extruded region being used to generate the computational image.

In the three-dimensional shape measuring system, an imaging direction for the base image may be always set to a direction parallel to or orthogonal to one of the at least one extruding direction.

In an aspect of this disclosure, the controller may be configured to identify, when the reference structure comprises one reference structure, the extruded region formed by the one reference structure as the target region, and be configured to identify, when the reference structure comprises a plurality of reference structures, a logical-product region or a logical-sum region of extruded regions which are respectively formed by the plurality of reference structures as the target region, and crop out a region other than the target region from the base image to generate the computational image.

In another aspect of this disclosure, the controller may be configured to identify, as the target region, a logical-sum region of extruded regions having mutually parallel extruding directions and a logical-product region of extruded regions having mutually orthogonal extruding directions.

In a further aspect of this disclosure, the at least one reference structure may comprise a target object attachment device to which the target object is attached, and a direction along which the target object is attached to the target object attachment device may be defined as an extruding direction for the target object attachment device.

In this case, the controller may be configured to generate three-dimensional shape data for the target object based on the computational image, and previously store, in association with the target object attachment device, a property corresponding to a characteristic feature of the target object which is attached to the target object attachment device, and may be configured to assign, when the target object attachment device is selected as the reference structure, the property associated with the target object attachment device to the three-dimensional shape data for the target object.

In the three-dimensional shape measuring system disclosed herein, because the computation image is generated based on the extruded region of the reference structure, undesired data can be easily removed from the captured image of the target object even in a situation where the position and size of the target object are varied.

BRIEF DESCRIPTION OF DRAWINGS

Embodiments of the present disclosure will be described based on the following figures, wherein:

FIG. 2 is a block diagram showing a configuration of the three-dimensional shape measuring system;

FIG. 8A shows an example of a structure table for a machining center;

FIG. 8B shows an example of a structure table for a turret lathe;

DESCRIPTION OF EMBODIMENTS

Figure 1:
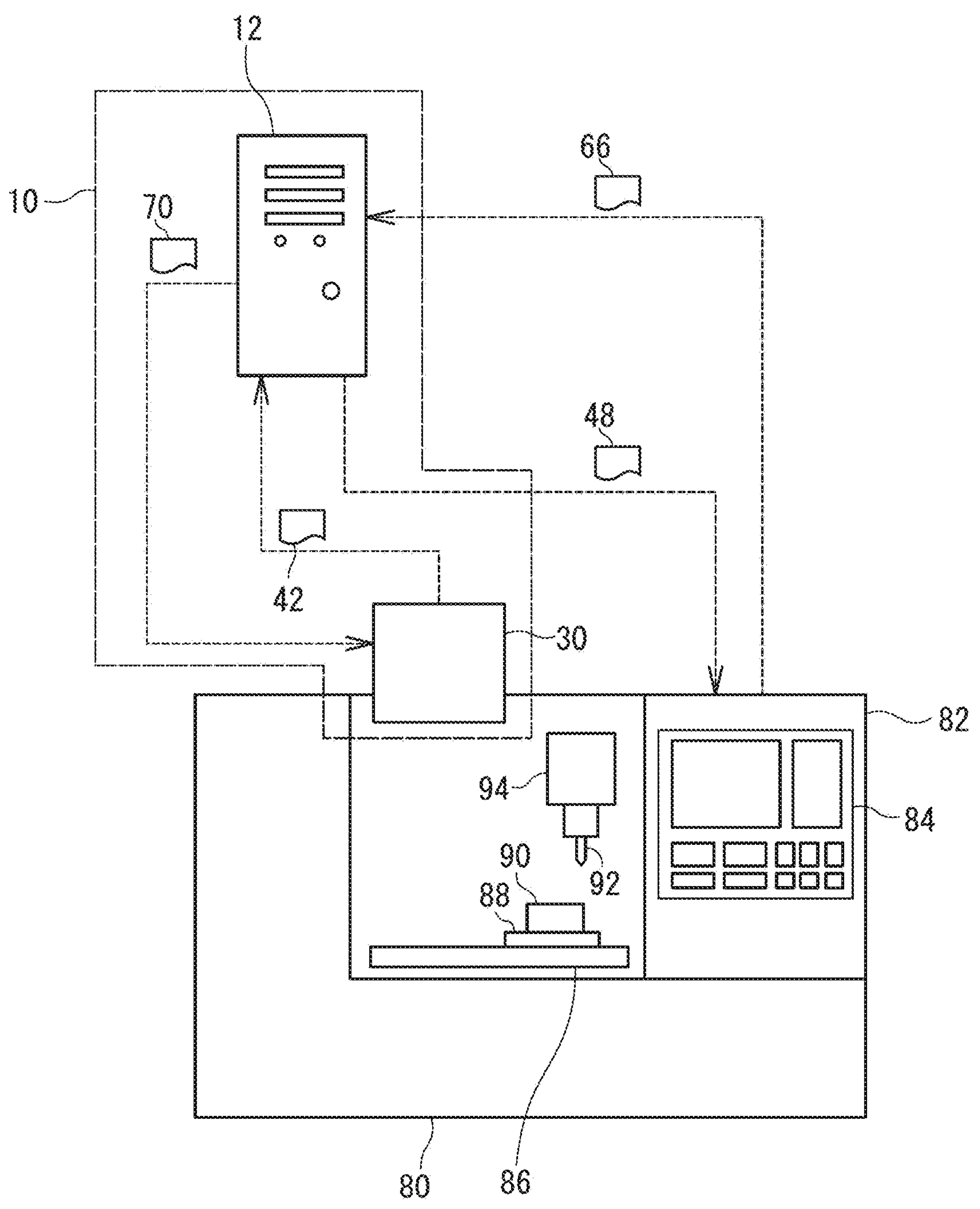
FIG. 1 is a block diagram showing components of a three-dimensional shape measuring system.

Hereinafter, a three-dimensional shape measuring system 10 will be explained with reference to the drawings. FIG. 1 is a block diagram showing components of the three-dimensional shape measuring system 10. In the example shown in FIG. 1, the three-dimensional shape measuring system 10 is used in combination with a machine tool 80.

The machine tool 80 performs a predetermined machining operation on a workpiece 90 to manufacture a product. The machine tool 80 is not limited to be of a specific type. For example, the machine tool 80 may be a press machine for pressing the workpiece 90, a coating machine for applying a coating to the workpiece 90, or a cutting machine for cutting the workpiece 90. In FIG. 1, the machine tool 80 is a machining center equipped with a translatable table 86. The machine tool 80 includes a spindle head 94 in addition to the table 86.

The machine tool 80 further includes a numerical control device 82. The numerical control device 82 analyzes a machining program (also referred to as an "NC program") to generate numerical information representing, in the form of numerical values and signs, a tool path with respect to a workpiece, process steps necessary for a machining process, for example. Based on the numerical information, the numerical control device 82 controls operation of the machine tool 80. The numerical control device 82 is physically implemented by a computer incorporating a processor and a memory. The machine tool 80 further includes an operation panel 84 configured to present information to an operator and receive an instruction from the operator. The numerical control device 82 is able to communicate with a controller 12 in the three-dimensional shape measuring system 10 through wired communication or wireless communication.

The three-dimensional shape measuring system 10 generates point cloud data 46 representing a shape of a target object 40 and three-dimensional shape data 48 (such as, for example, CAD data). In the following description, the three-dimensional shape data are referred to as "model data". Here, the target object 40 may be any object which can be imaged by an image capturing unit 30 which will be described below, and no other limitations are imposed on the target object 40. Therefore, the target object 40 may be, for example, the workpiece 90, a tool 92, a jig, and the like. The model data 48 for the target object 40 are sent to the numerical control device 82 and used therein for a variety of simulations and determinations. For example, in a case where the workpiece 90 is specified as the target object 40, the numerical control device 82 performs, based on model data 48 for the workpiece 90, various operations, such as an interference check to check interference between the tool 92 and the workpiece 90, generation of a path of the tool 92, a determination of a machining accuracy, a determination as to whether a shape of the target object 40 matches a reference shape, and a determination as to whether the target object 40 is located at a predetermined position, for example. Meanwhile, in a case where the tool 92 is specified as the target object 40, the numerical control device 82 determines, based on the model data 48 for the tool 92, a degree of wear of the tool 92, a type of the tool 92, and whether an attached state of the tool 92 is appropriate, for example.

The three-dimensional shape measuring system 10 includes the controller 12 and the image capturing unit 30. The image capturing unit 30 captures an image of the target object 40 in accordance with an imaging condition 70 transmitted from the controller 12, to acquire a base image 42. As used herein, the imaging condition 70 is a condition of capturing the base image 42, and includes an imaging direction, an imaging position, and an imaging magnification, for example. The image capturing unit 30 transmits the base image 42 to the controller 12.

The controller 12 controls an image capturing process performed by the image capturing unit 30, and generates, based on the base image 42, the point cloud data 46 and the model data 48 for the target object 40, to identify a shape of the target object 40. The generated model data 48 are transmitted to the numerical control device 82. In addition, as will be described in detail below, the controller 12 acquires machining information 66 from the numerical control device 82. The machining information 66 includes control statuses of known structures installed in the machine tool 80. Specifically, the machine tool 80 includes a plurality of structures, such as the table 86 and the spindle head 94, the shapes of the structures being known. Some of the known structures may be changed in position and orientation depending on progress of machining operation. The machining information 66 further includes information about such positions and orientations of the known structures.

Next, a configuration of the three-dimensional shape measuring system 10 is described in detail. FIG. 2 is a block diagram showing the configuration of the three-dimensional shape measuring system 10. As shown in FIG. 2 and as described above, the three-dimensional shape measuring system 10 includes the controller 12 and the image capturing unit 30.

The controller 12 is physically implemented by a computer incorporating a processor 14, a memory 16, a communication interface (communication I/F) 22, and a user interface device (UI device) 24. The term "computer" used herein includes a microcomputer in which a computer system is incorporated into one integrated circuit. Further, the processor 14 denotes a processor used in a broad sense, and includes a general-purpose processor (such as, for example, a Central Processing Unit; CPU), and a special purpose processor (such as, for example, a Graphics Processing Unit; GPU, an Application Specific Integrated Circuit; ASIC, a Field Programmable Gate Array; FPGA, and a programmable logical device).

The memory 16 is a device for storing various types of data and includes both a main storage which is directly accessed by the processor 14, and an auxiliary storage which is accessed through input and output channels by the processor 14. The main storage includes, for example, a semiconductor memory. The auxiliary storage includes, for example, a semiconductor memory and a magnetic storage.

The memory 16 stores a model database (model DB) 18 and a structure table 20. The model DB 18 is a database in which model data for each of the plurality of known structures are stored. The known structures may be any structures whose shapes have been known, and no other specific limitations are imposed on the known structures. Therefore, the known structures may include at least one of the table 86, the spindle head 94, a vise 88, a cover, and a fastening bed, for example. When the machine tool 80 is a lathe, a multi-tasking machine, or the like, the known structures may include at least one of a work spindle, a turret, a tool post, and a tailstock, in addition to or in place of the known structures described above. Model data for the known structures may be generated by the controller 12 or generated by another computer (such as, for example, the numerical control device 82) rather than the controller 12. The model data generated by the other computer are transmitted through the communication I/F 22 to the controller 12 and registered in the model DB 18. The structure table 20 is a table in which information on each of the plurality of known structures is recorded. The information to be recorded in the structure table 20 will be described further below in detail.

The communication I/F 22 is configured to transmit and receive data to and from other, external electronic devices through wired communication or wireless communication. The communication I/F 22 communicates with the numerical control device 82 and the image capturing unit 30, for example. The UI device 24 is configured to present various types of information to an operator and receive an instruction from the operator. The UI device 24 includes, for example, an output device, such as a display or a speaker, and an input device, such as a keyboard, a mouse, a microphone, or a touch panel. It should be noted that the UI device 24, which in this example is described as a component of the controller 12, may be configured in part or in its entirety as a separate device which is completely different from the controller 12. For example, some of the functions of the UI device 24 may be implemented by a user interface of an information terminal (such as, for example, a smartphone) that is owned by the operator and is capable of communicating with the controller 12. In addition, the controller 12 is not necessarily implemented by a single computer, and may be implemented by a combination of computers which are physically separated.

The image capturing unit 30 is configured to capture images of the target object 40 existing in a machining chamber of the machine tool 80. The image capturing unit 30 includes, as shown in FIG. 2, a camera 32 and a light source 34. The camera 32 images the target object 40 to acquire the base image 42. The camera 32 transmits the base image 42 to the controller 12. It should be noted that the camera 32 may be one camera or may include two or more cameras. The light source 34 is configured to illuminate the target object 40. The light source 34 may be a light which simply emits light onto the target object 40, or a projector which emits a predetermined pattern of light onto the target object 40.

Figure 3:
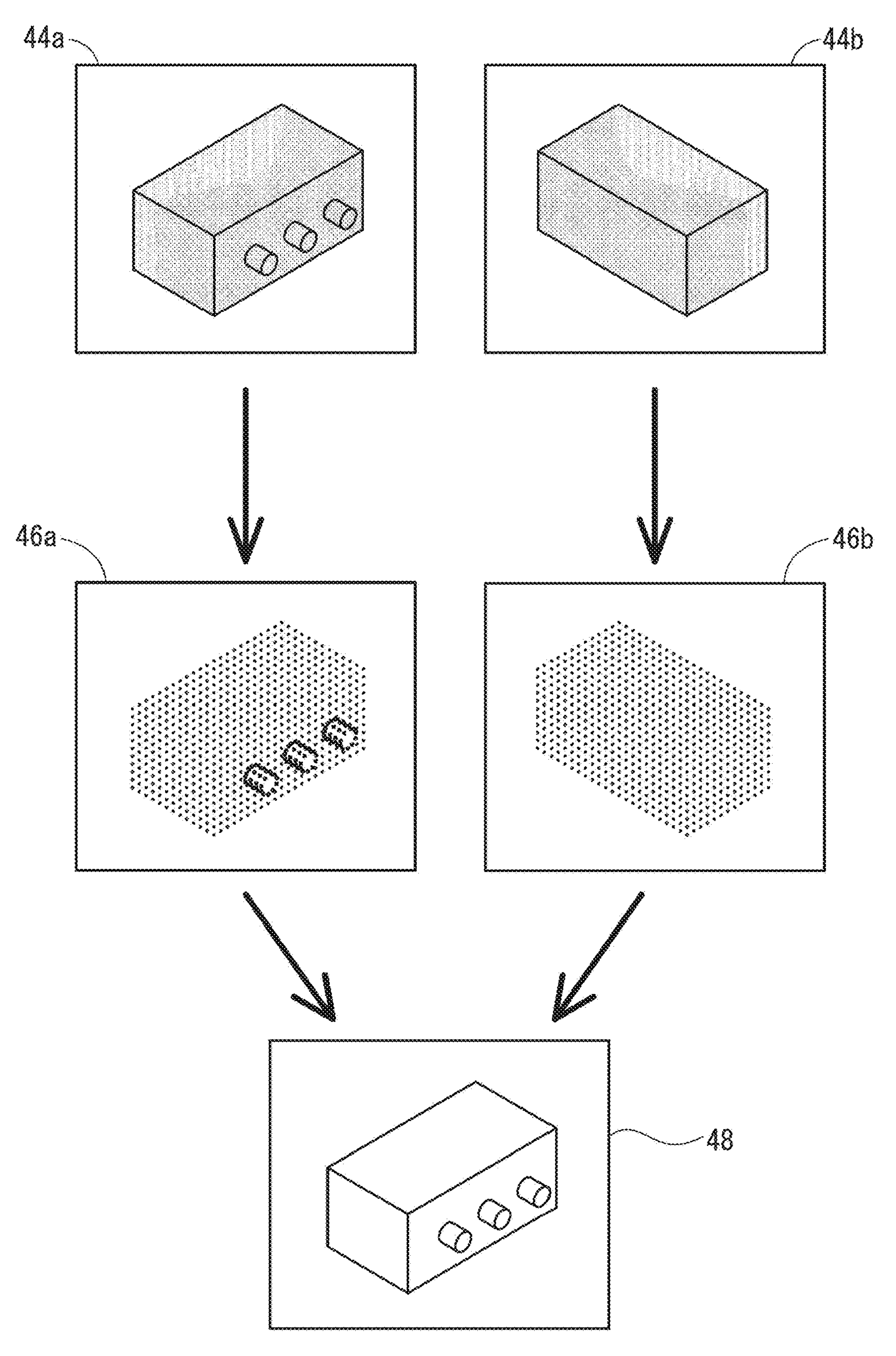
FIG. 3 is a diagram showing a process of generating model data for a target object.

Next, operation performed to generate the model data 48 for the target object 40 by the three-dimensional shape measuring system 10 is explained with reference to FIG. 3. To generate the model data 48 for the target object 40, the controller 12 operates the image capturing unit 30 to acquire the base image 42 of the target object 40. In this step, the image of the target object 40 is captured two or more times while changing a relative position and an angle of the target object 40 with respect to the camera 32, in order to acquire the base image 42 for each of some or all of the surfaces of the target object 40. The relative position and the angle of the target object 40 with respect to the camera 32 may be changed by moving either the target object 40 or the camera 32 or by moving both of the target object 40 and the camera 32. The image capturing unit 30 may include a moving mechanism dedicated to the image capturing unit 30. The image capturing unit 30 may be attached to a movable component in the machine tool 80 (such as, for example, the spindle head 94 in the machining center or the tool post in the lathe). In this case, the relative position and angle of the target object 40 with respect to the image capturing unit 30 can be changed when the movable object is moved.

The controller 12 crops a part of the acquired base image 42 to generate a computational image 44. FIG. 3 shows on its top portion two computational images 44*a* and 44*b* extracted from two base images 42. The procedure for generating the computational image 44 will be described further below. Then, the controller 12 generates the point cloud data 46 for the target object 40 based on the computational image 44. In the example of FIG. 3, the controller 12 acquires the computational image 44*a* which is an image of the target object 40 captured along a first direction, and the computational image 44*b* which is an image of the target object 40 captured along a second direction different from the first direction. The controller 12 generates two or more sets of point cloud data 46*a* and 46*b* for the target object 40 from the two computational images 44*a* and 44*b*, respectively. The controller 12 merges the two or more sets of point could data 46*a*, 46*b* into a set of point cloud data 46 and subsequently generates the model data 48 based on the merged set of point cloud data 46.

It should be noted that the point cloud data 46 are computed with an optical cutting method, a phase shift method, a trigonometric method, a stereo method, or a combination thereof. When the optical cutting method or the phase shift method is used, the light source 34 illuminates the target object 40 with a pattern of light suitable for the method. Further, when a trigonometric method is used, the image capturing unit 30 causes two or more cameras 32 spaced from each other to concurrently capture images of a single target object 40.

Further note that the procedure for generating the model data 48 from the point cloud data 46 may be performed by any conventional technique and is not explained in detail herein. In the above-described example, generation of the model data 48 is performed after merging the two or more sets of point cloud data 46*a* and 46*b*, although the order of the generation and the merging may be reversed. For example, two or more sets of surface data may be respectively generated for each of the two or more sets of point cloud data 46*a* and 46*b*, and the two or more sets of surface data may be subsequently merged to generate the model data 48.

Meanwhile, as described above, a part of the base image 42 is cropped out to generate the computational image 44, and in this example the point cloud data 46 are generated based on the computational image 44. The reason for generating the computational image 44 is to prevent an erroneous measurement and reduce the amount of computation. Specifically, the base image 42 acquired by the camera 32 typically includes a large number of images of objects other than the target object 40. In a case where the point cloud data 46 are directly computed from such a base image 42, there is a high possibility that the shape of the target object 40 may be erroneously measured. Further, in this case, points located on a site irrelevant to the target object 40 must be computed, which increases the amount of computation. To avoid such disadvantages, the computational image 44 is generated by cropping out an undesired part of the base image 42.

Hereinafter, the generation of the computational image 44 is explained. In this example, the computational image 44 is generated using model data for a known structure. FIG. 4 to FIG. 7 are schematic diagrams showing a process of generating the computational image 44.

In this example, a particular known structure is taken as a reference structure 52, and the computational image 44 is generated based on an extruded region 56 which is formed by extruding the reference structure 52 along a predetermined extruding direction. Specifically, the machine tool 80 is equipped with many known structures, such as the table 86 and the vise 88, as described above. In operation to measure the shape of the target object 40, the operator specifies one or more structures from the known structures as one or more reference structures 52. The controller 12 computes the extruded region 56 formed by extruding the reference structure 52 along the predetermined extruding direction. Then, the controller 12 overlays the computed extruded region 56 on the base image 42, maintains a region inside the extruded region 56 as a target region 60, and crops out a region outside the extruded region 56 as an undesired region. An image obtained by the cropping is used as the computed image 44.

Figure 4:
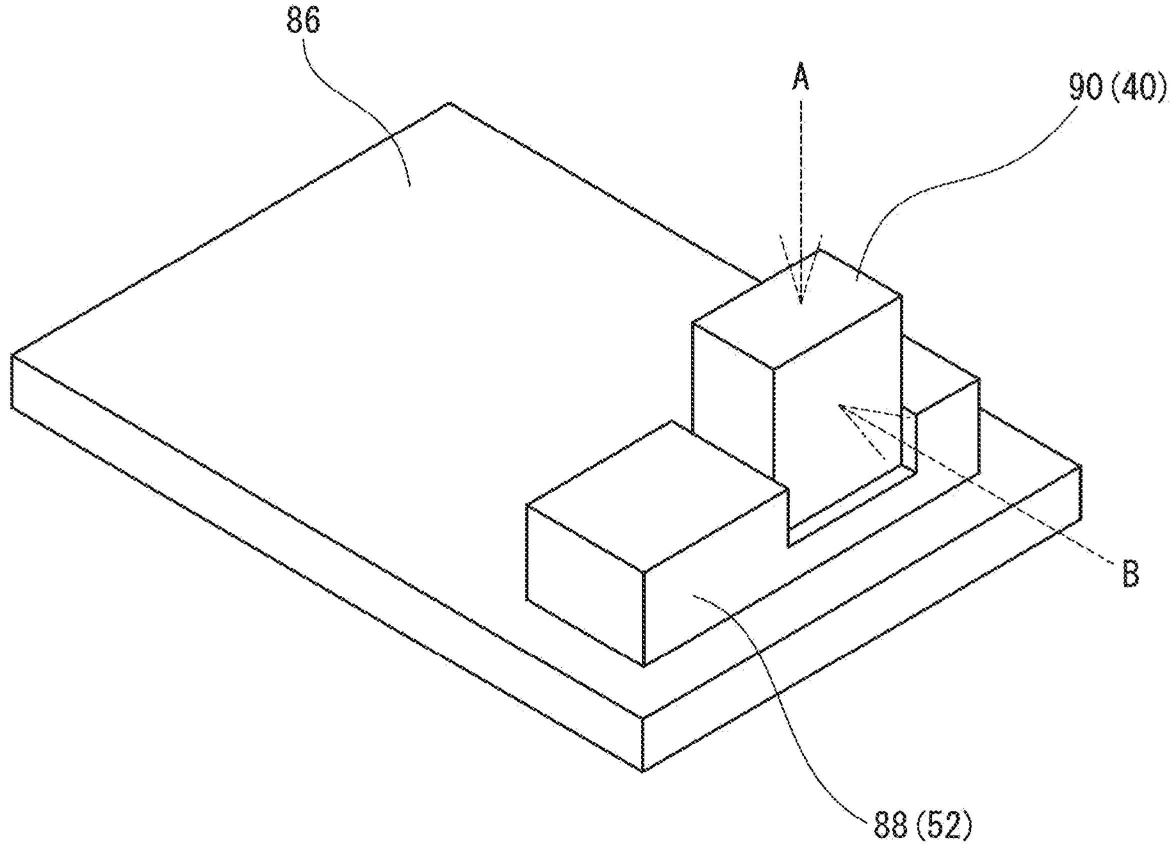
FIG. 4 shows an example of the target object.

For example, it is assumed that as shown in FIG. 4, the vise 88 is fixed onto the table 86, and the workpiece 90 being the target object 40 is attached to the vise 88. It should be noted that the table 86 is translated with the progress of a machining process. Such a translating motion of the table 86 is controlled by the numerical control device 82. The vise 88 is manually fixed to the table 86. A relative position of the vise 88 with respect to the table 86 is previously measured by a sensor (not illustrated in FIG. 4) installed in the machine tool 80. The machining information 66 transmitted from the numerical control device 82 to the controller 12 includes information on positions and orientations of the table 85 and information on a fixed position of the vise 88.

Figure 5:
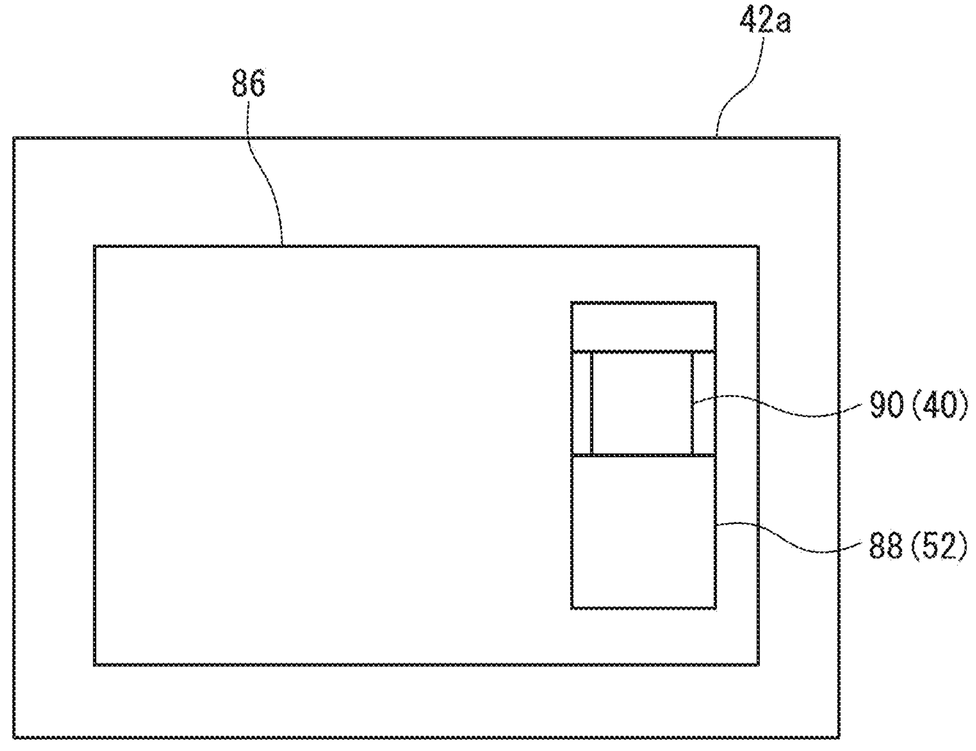
FIG. 5 shows a first base image obtained by capturing an image of the target object along an arrow A direction.

In the state depicted in FIG. 4, a situation where the vise 88 is selected as a reference structure 52 and the arrow A direction is determined as an extruding direction is considered below. In this situation, the controller 12 instructs the image capturing unit 30 to take a direction parallel to or orthogonal to the extruding direction as an imaging direction. FIG. 5 shows a first base image 42*a* acquired by capturing an image of the workpiece 90 being the target object 40 from the arrow A direction. As is evident from FIG. 5, the first base image 42*a* includes a multiplicity of images of objects other than the workpiece 90 in this situation. Here, the image of the target object 40 may be captured a plurality of times at mutually different positions in the same direction, and a plurality of captured images may be merged into one image which is taken as the base image 42, for the purpose of improving a resolution of the base image 42 or acquiring, as the base image, an image having an angle of view wider than that of a one-shot view.

Figure 6:
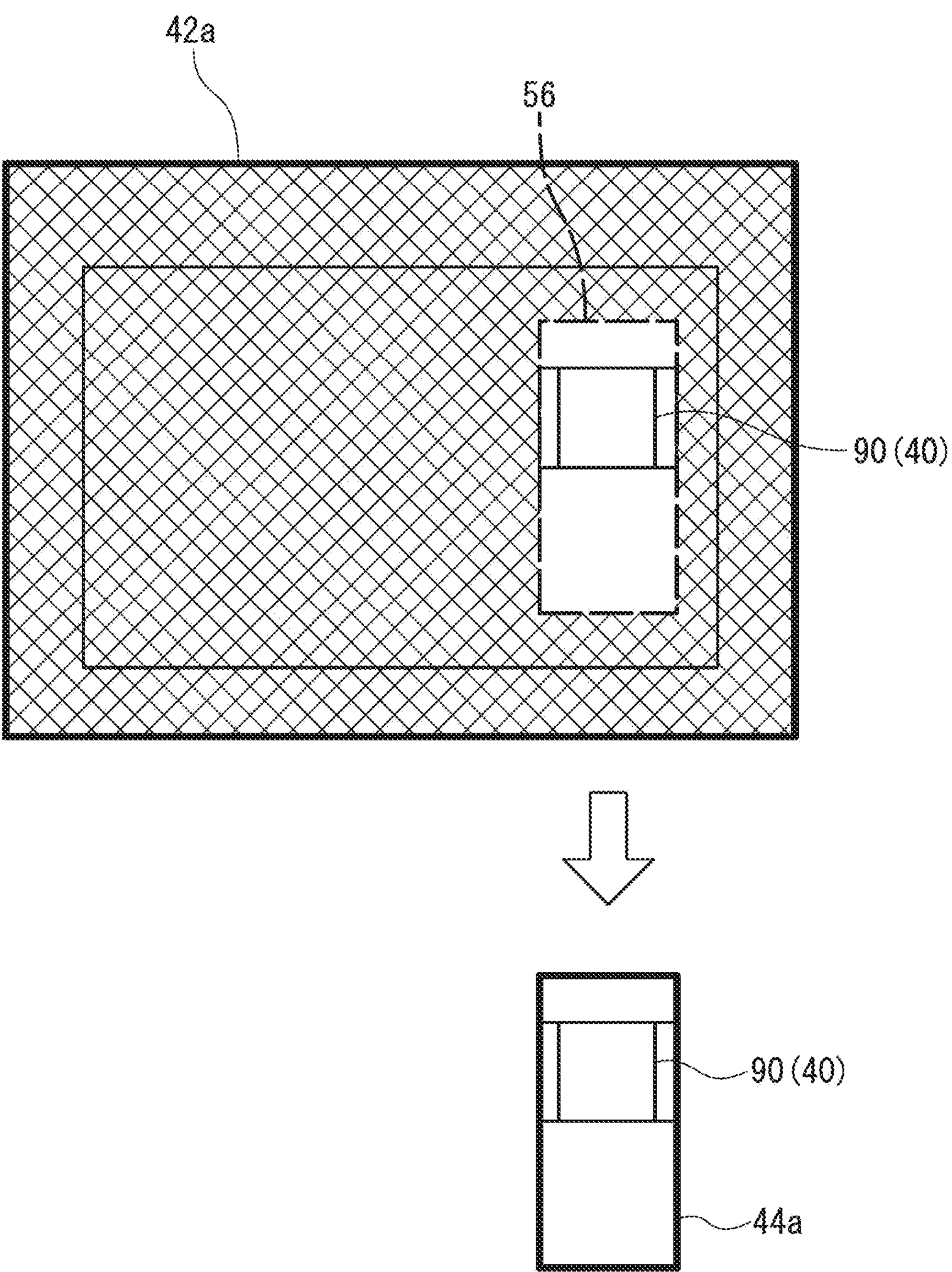
FIG. 6 shows a process of computing a first computational image from a first base image.

The controller 12 computes the extruded region 56 formed by extruding the vise 88 being the reference structure 52 along the extruding direction (i.e., the arrow A direction), in order to remove undesired portions from the first base image 42*a*. Then, the controller 12 overlays the computed extruded region 56 on the first base image 42*a*. FIG. 6 shows the first base image 42*a* overlayed by the extruded region 56. The controller 12 identifies an interior of the extruded region 56 as a target region 60 and identifies an exterior of the extruded region 56 as an undesired region. In FIG. 6, the cross-hatched region represents the undesired region. The controller 12 computes, as the first computational image 44*a*, an image of only the target region 60 extracted from the first base image 42*a*; that is, the image obtained by cropping out the undesired region from the first base image 42*a*. Following this, the controller 12 generates, based on the first computational image 44*a*, the point cloud data 46 for the target object 40.

Figure 7:
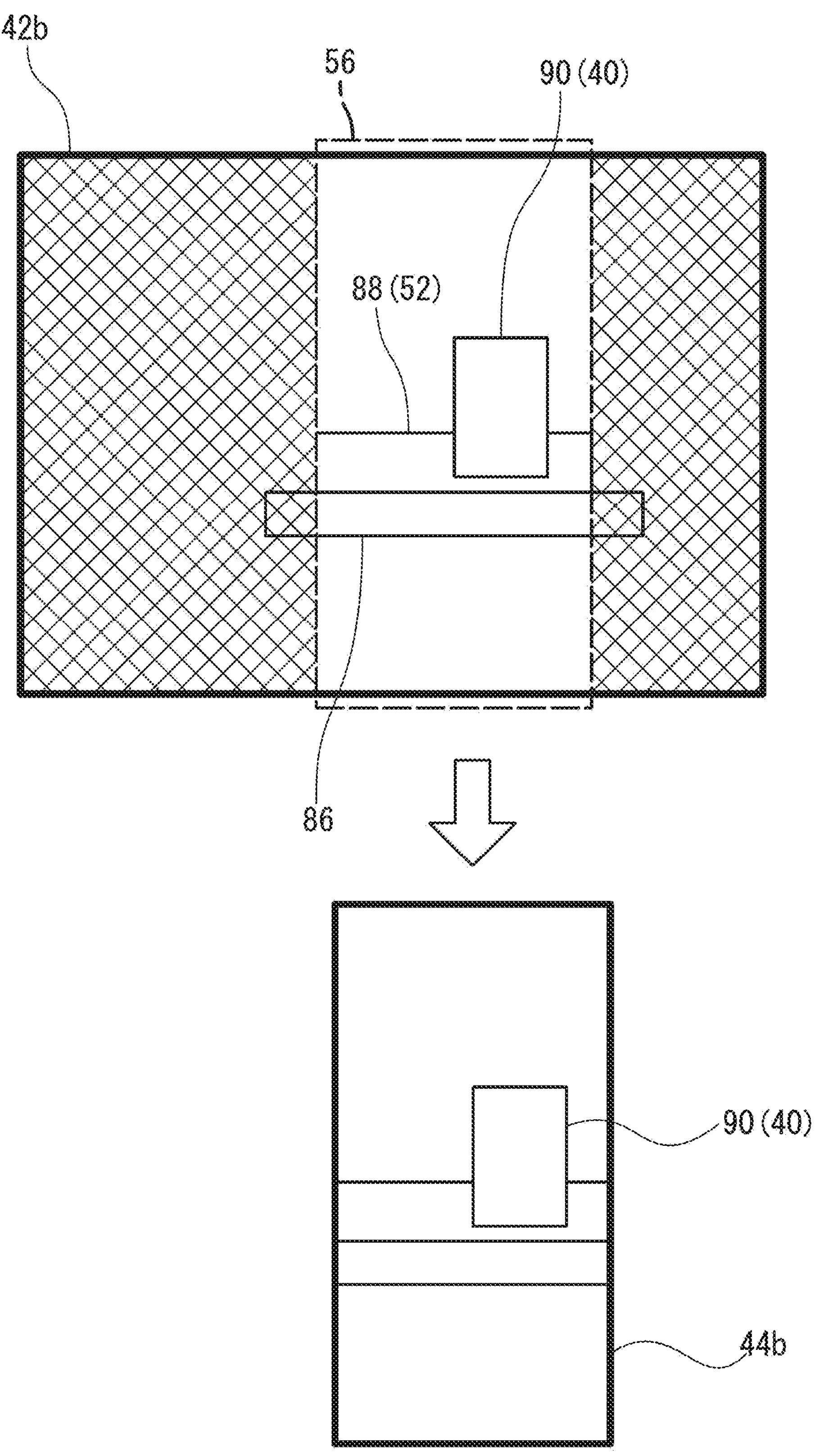
FIG. 7 shows a process of computing a second computational image from a second base image.

Another base image 42 obtained by imaging the workpiece 90 along another direction is processed by a process similar to the above-described process. For example, FIG. 7 shows a second base image 42*b* acquired by imaging the workpiece 90 along an arrow B direction. Also in this case, the controller 12 computes an extruded region 56 formed by extruding the vise 88 along the extruding direction (i.e., the arrow A direction), and overlays the computed extruded region 56 on the second base image 42*b*. Then, the controller 12 identifies an interior of the extruded region 56 as a target region 60, and identifies an exterior of the extruded region 56 as an undesired region. In FIG. 7, the cross-hatched region depicts the undesired region. The controller 12 computes, as a second computational image 44*b*, an image of only the target region 60 extracted from the second base image 42*b*. Then, the controller 12 generates, based on the second computational image 44*b*, the point cloud data 46.

As can be clearly understood from the above explanation, in this example, the computational image 44 is computed by cropping out a part of the base image 42, and the point cloud data 46 are generated based on the computational image 44. In this way, the amount of computation needed to compute the point cloud data 46 can be reduced, while the possibility that an object other than the target object 40 is erroneously measured as the target object 40 can be decreased.

In connection with the process of cropping out the undesired part of the base image 42, techniques other than the above-described technique may be considered. For example, Patent Document 1 describes a technique in which a region which should be extracted as a computational image 44 from a base image 42 is previously stored. However, because the stored region is unchangeable in the technique of Patent Document 1, the technique of Patent Document 1 suffers from a problem in that the computational image 44 cannot be properly extracted when the position and size of the target object 40 are greatly changed. On the other hand, in the present example of this disclosure, because the reference structure 52 is specified by the operator based on the target object 40, the target region 60 can be properly set even when the position and size of the target object 40 are greatly changed.

Further, as another technique, it may be considered that an operator specifies, while viewing a base image 42, a rectangular range taken as a target region 60 using an input device, such as a mouse. Hereinafter, the technique in which the operator directly specifies the target region 60 is referred to as a "directly specifying mode". According to the directly specifying mode, even when the position and size of the target object 40 are greatly changed, the target region 60 can be suitably set. However, in the directly specifying mode, the operator is required to perform a task of specifying the target region 60 for each of a plurality of base images 42, which will impose a burden on the operator. For example, a process of specifying the first computational image 44*a* and the second computational image 44*b* shown in FIG. 6 and FIG. 7 according to the directly specifying mode is considered. In this process, because it is necessary for the operator to perform the task of specifying the target region 60 twice, the operator's labor is increased.

On the other hand, the technique of extracting the extruded region 56 formed by the reference structure 52 as the target region 60 as in the case of this example can reduce the number of operator's tasks needed to compute a plurality of computational images 44 from a plurality of base images 42. For instance, a process of computing the first computational image 44*a* and the second computational image 44*b* shown in FIG. 6 and FIG. 7 is considered. In this process, the operator is only required to specify the reference structure 52 (i.e., the vise 88) and the extruding direction (i.e., the arrow A direction) at the beginning of the process. Only by doing so, the suitable computational image 44 can be computed even when the imaging direction is changed. As a result, the operator's labor can be greatly reduced as compared to the directly specifying mode.

Further, in this example, a structure which is moved together with the target object 40 is selected as the reference structure 52. Specifically, in the example of FIG. 4, the vise 88 to which the workpiece 90 is attached is selected as the reference structure 52. For this reason, when the position and orientation of the workpiece 90 (i.e., the target object 40) are changed in response to a change in position and orientation of the table 86, the relative position of the vise 88 (i.e., the reference structure 52) with respect to the workpiece 90 remains unchanged. Therefore, in this case, the computational image 44 can be suitably extracted regardless of the position and orientation of the workpiece 90 being changed.

In particular, the shape of one workpiece 90 may be measured multiple times with the progress of machining operation in the machine tool 80. For example, the shape of the one workpiece 90 may be measured in some cases at each of points in time prior to commencement of a machining process, subsequent to completion of rough machining, and subsequent to completion of finish machining. In these cases, the position of the workpiece 90 may be changed depending on the points in time. When a structure movable with the target object 40 is selected as the reference structure 52, the computational image 44 can be appropriately extracted regardless of the position of the workpiece 90 having been changed, without the need to re-specify the reference structure 52. As a result, the labor of the operator can be greatly reduced.

Next, a process to determine the extruding direction is explained. As repeatedly explained above, the computational image 44 is extracted, in this example, based on the extruded region 56 obtained by extruding the reference structure 52 along the extruding direction. Here, the extruding direction may be specified by the operator or may be a predetermined direction. In connection with a target object attachment device to which the target object 40 is attached, for example, a direction along which the target object 40 is attached may be previously defined as the extruding direction. Here, when a workpiece is selected as the target object 40, the vise 88, the table, a work spindle, or the like is considered a target object attachment device. For example, in connection with the vise 88, because the workpiece 90 is attached to the vise 88 along the direction A, the direction A may be previously defined as the extruding direction for the vise 88. Similarly, for a lathe, because the workpiece 90 is attached to the work spindle along a direction of the work rotation axis, the direction of the work rotation axis may be previously defined as the extruding direction for the work spindle.

Meanwhile, when the tool 92 is selected as the target object 40, the spindle head 94 in the machining center, the turret in the turret lathe, and the like are considered as a target object attachment device. However, the turret is typically equipped with a plurality of tool mounts. In other words, there are a plurality of attaching directions along which the target object 40 (a tool) is attached to the turret. In this case, the controller 12 may be configured to show the operator the plurality of attaching directions as extruding direction candidates. Then, the operator can select one extruding direction from the candidates.

In another form, the operator may specify an extruding direction. A procedure to specify the extruding direction is not limited to any particular procedure. For example, the operator may specify coordinates of two points, and the controller 12 may be configured to identify, as the extruding direction, a direction parallel to a line passing through the two points. In a further form, the operator may specify a particular plane, and the controller 12 may be configured to identify as the extruding direction a direction orthogonal to the specified plane.

The structure table 20 includes records of known structures and extruding directions associated therewith. FIG. 8A shows an example of the structure table 20 for the machining center, and FIG. 8B shows an example of the structure table 20 for the turret lathe. When a reference structure 52 is specified by the operator, the controller 12 searches the structure table 20 for the specified reference structure 52, to identify the extruding direction of the specified reference structure 52. In a case where only one direction is recorded as the extruding direction for the reference structure 52 in the structure table 20, the controller 12 automatically determines the one direction as the extruding direction. In another case where two or more directions are recorded as extruding directions for the reference structure 52 in the structure table 20, the controller 12 shows the two or more directions to the operator as extruding direction candidates. In a further case where an expression "Specified by Operator" is recorded as the extruding direction in the structure table 20, the controller 12 prompts the operator to specify an extruding direction.

Next, a process to specify the reference structure 52 is explained. In this example, the operator specifies one or more reference structures 52 as described above. No particular limitation is imposed on a way of specifying the reference structures 52. Therefore, images (such as illustrations or CG drawings, for example) of the known structures may be displayed on a display of the UI device 24, to enable specification of the reference structures 52. For example, when an input to specify the reference structure 52 is received from the operator, the controller 12 may be configured to acquire a captured image of the target object 40, and display images of known structures which can be specified as the reference structure 52 on the display in a state of being overlayed on the captured image of the target object 40. In this case, the task of the operator is only to select a desired image for use as the reference structure 52 from the images of the known structures. In this way, the operator is able to visually determine a known structure suitable for the reference structure 52. Rather than such a specifying procedure, another specifying procedure may be employed, of course. For example, the operator may input a file path to a data file storing a model of the known structure which is desired by the operator for use as the reference structure 52.

The reference structure 52 to be specified is not limited to one reference structure and may include a plurality of reference structures. When two or more reference structures 52 are selected, the controller 12 performs a logical operation to obtain a logical sum or a logical product of the two or more extruded regions 56, and determines a region acquired by the logical operation as a target region 60.

Specifically, when extruded regions 56 respectively obtained from the two or more reference structures 52 are parallel to each other, the controller 12 determines a logical-sum region of the two or more extruded regions 56 as the target region 60. When the extruded regions 56 of the two or more reference structures 52 are non-parallel to each other, the controller 12 determines a logical-product region of the extruded regions 56 as the target region 60.

Figure 9:
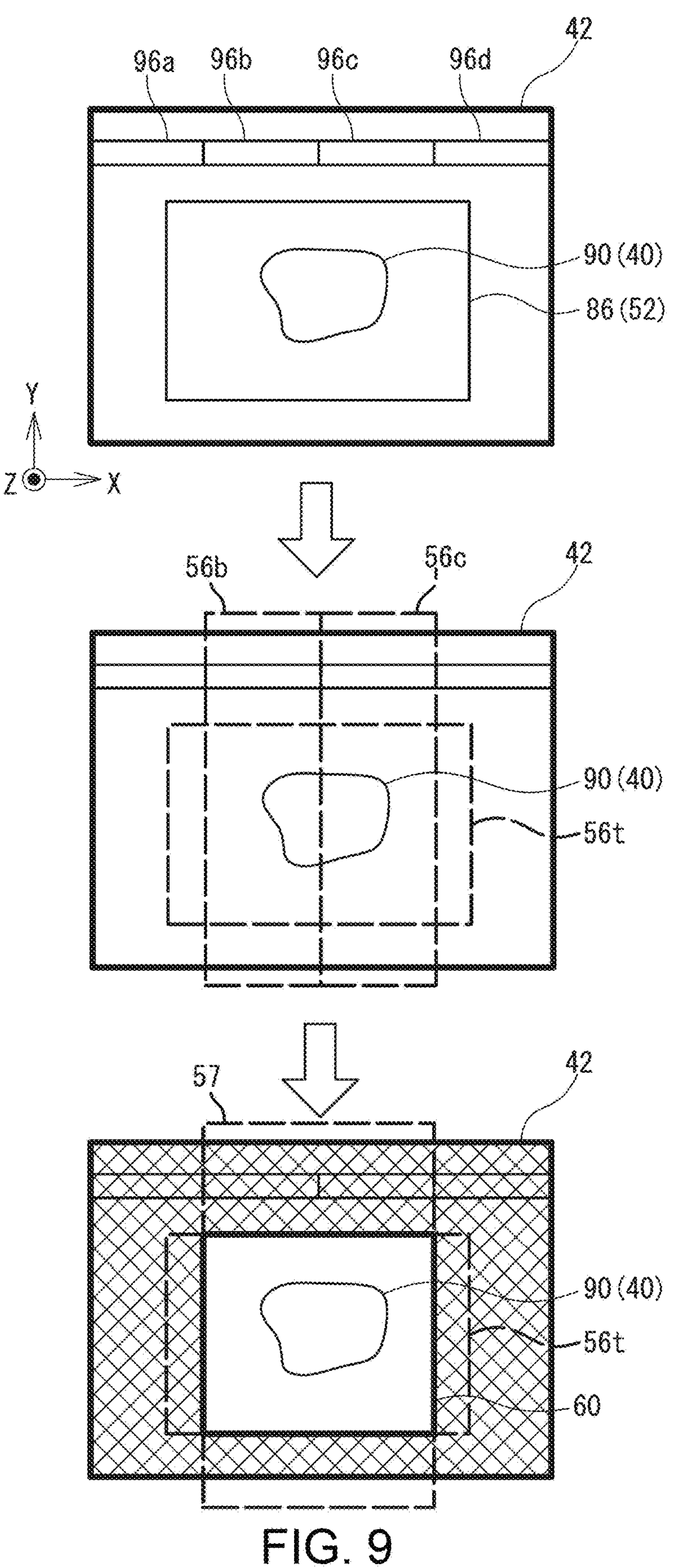
FIG. 9 shows a process of computing a computational image when a plurality of reference structures are selected.

For example, a situation is considered in which as shown in FIG. 9, a workpiece 90 is placed on a table 86, and a plurality covers 96*a* to 96*d* are placed facing one side of the workpiece 90. A direction Z (i.e., the vertical direction relative to a surface of paper showing FIG. 9) is defined as the extruding direction for the table 86, and a direction Y (i.e., the longitudinal direction of the paper) is defined as the extruding direction for the covers 96*a* to 96*d*. In this situation, it is assumed that the table 86, the cover 96*b*, and the cover 96*c* are selected as reference structures 52 for measuring the shape of the workpiece 90.

In this situation, the controller 12 organizes the reference structures 52 into one or more groups based on the extruding directions in such a manner that each of the groups consists of reference structures 52 having extruding directions parallel to each other. Following this, the controller 12 computes, for each of the groups, a logical sum of extruded regions 56 of the reference structures 52 belonging to the same group. Then, the controller 12 computes a logical product of logical sums of the extruded regions 56 respectively computed for the groups, to obtain a logical-product region, and determines the logical-product region as the target region 60.

In the example shown in FIG. 9, the controller 12 organizes a first group consisting of the covers 96*b* and 96*c* and a second group consisting of the table 86. Then, the controller 12 finds a logical-sum region 57 of an extruded region 56*b* obtained from the cover 96*b* and an extruded region 56*c* obtained from the cover 96*c*. Then, the controller 12 computes a logical-product region of the logical-sum region 57 and an extruded region 56*t* obtained from the table 86, and determines the logical-product region as the target region 60. In the image shown in the lowest part of FIG. 9, a non-hatched region represents the target region 60. It should be noted that in this example which of the logical sum or the logical product is computed is automatically determined based on the extruding directions, although such a determination may be made by the operator. In this regard, a logical-sum of two extruded regions 56 having different extruding directions may be computed when the operator desires to do so.

The reference structure 52 may include the target object attachment device to which the target object 40 is attached. The target object attachment device may be associated with property information which is to be given to model data 48 for the target object 40 in accordance with an instruction of the operator.

Specifically, the three-dimensional measurement system 10 generates the model data 48 for the target object 40. The generated model data 48 is used for a simulation designed to perform an interference check, for example. For proper implementation of the simulation, it is necessary that various types of property information, such as information as to whether cutting is applicable, for example, should be previously assigned to the model data 48 for the target 40. However, setting the property information every time a set of model data 48 is generated has been a burdensome task for the operator.

With this in view, the property information may be previously associated with the target object attachment device. When a target object attachment device is selected as the reference structure 52, the controller 12 automatically assigns the property information to model data 48 generated using the reference structure 52 (i.e., the target object attachment device). The property information may be previously recorded in the structure table 20. In the example shown in FIG. 8A and FIG. 8B, applicability of cutting is recorded as property information. Cutting is recorded as being "applicable" for the target object attachment device, such as, for example, the table 86 and the vise 88, to which the workpiece 90 is attached. Accordingly, when the table 86 is selected as the reference structure 52, the controller 12 automatically assigns the property information indicating that cutting is "applicable" to model data 48 generated using the reference structure 52 (table 86). Further, in the example of FIG. 8A and FIG. 8B, cutting is recorded as being "unapplicable" for target object attachment devices, such as the spindle head 94 and the turret, for example, to which the tool 92 is attached. Therefore, when the spindle head 94 is selected as the reference structure 52, the controller 12 automatically assigns the property information indicating that cutting is "unapplicable" to model data 48 generated using the reference structure 52 (spindle head 94). When configured in this way, the operator's burden can be further reduced. It should be noted that the property information may not necessarily be recorded beforehand in the structure table 20 and may be specified by the operator.

Figure 10:
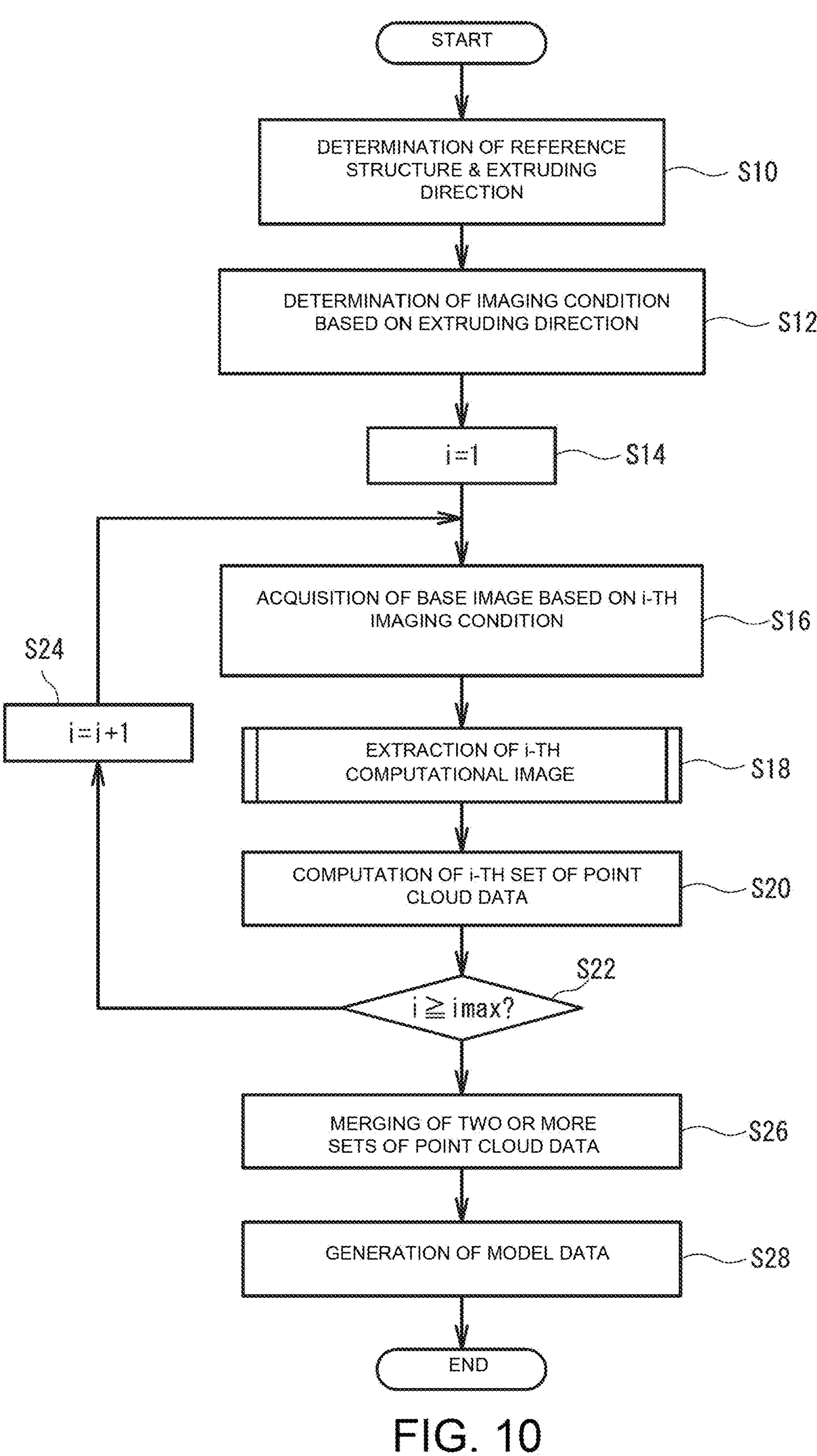
FIG. 10 is a flowchart showing a flow of process steps to generate model data for the target object.

Next, a flow of a process to generate the model data 48 for the target object 40 is described with reference to FIG. 10 and FIG. 11. When generation of three-dimensional shape data 48 for the target object 40 is desired, the controller 12 determines a reference structure 52 and an extruding direction thereof (step S10). The reference structure 52 is specified by the operator. The reference structure 52 to be specified may include one or more reference structures 52.

The extruding direction may be automatically determined by the controller, or may be manually specified by the operator.

Then, the controller 12 determines, based on the determined extruding direction, an imaging condition 70 for the target object 40 (step S12). In this step, the controller 12 determines one imaging condition 70 for each imaging direction. Therefore, for the target object 40 which is imaged from five imaging directions, the controller 12 determines five imaging conditions 70. In general, a plurality of imaging directions and thus a plurality of imaging conditions 70 are used. That is, it is necessary that the target object 40 should be imaged multiple times while changing the imaging directions, in order to acquire the entire shape of the target object 40. For this reason, in step S12, the controller 12 determines the plurality of imaging conditions 70 corresponding to mutually different imaging directions. Further, the controller 12 determines a direction parallel to the extruding direction and a direction perpendicular to the extruding direction as the imaging directions.

The imaging condition 70 includes at least the imaging direction and may further include at least one of an imaging position, an imaging magnification, and the number of image capturing times. Here, the reference structure 52 may be imaged two or more times for one imaging direction as described above. For example, the reference structure 52 may be imaged two or more times to obtain two or more images by the camera 32 while translating the camera 32 with its optical axis being maintained parallel to the direction A. Then, the obtained two or more images may be merged into one base image 42. To achieve this, the controller 12 may determine, as the imaging condition 70, conditions for the image capturing position, the imaging magnification, and the number of image capturing times, the conditions under which the entire image of the reference structure 52 can be acquired in each of the imaging directions. When the reference structure 52 is unmovably fixed to a position, the position of the reference structure 52 is recorded in the model DB 18. On the other hand, when the position of the reference structure 52 is changeable, for example, when the spindle head 94 or the like is selected as a reference structure 52, the position of the reference structure 52 is identified based on machining information 66 transmitted from the numerical control device 82.

Next, the controller 12 sets a value of parameter i to an initial value of "1" (step S14). Then, the controller 12 instructs the image capturing unit 30 to capture an image under an i-th imaging condition 70 to acquire an i-th base image 42 (step S16). The i-th base image 42 may be an image acquired by one image capturing operation or an image generated by merging two or more images as repeatedly explained above. After the i-th base image 42 is acquired, the controller 12 extracts from the i-th base image 42 an i-th computational image 44 using the reference structure 52 and the extruding direction determined in step S10 (step S18).

Figure 11:
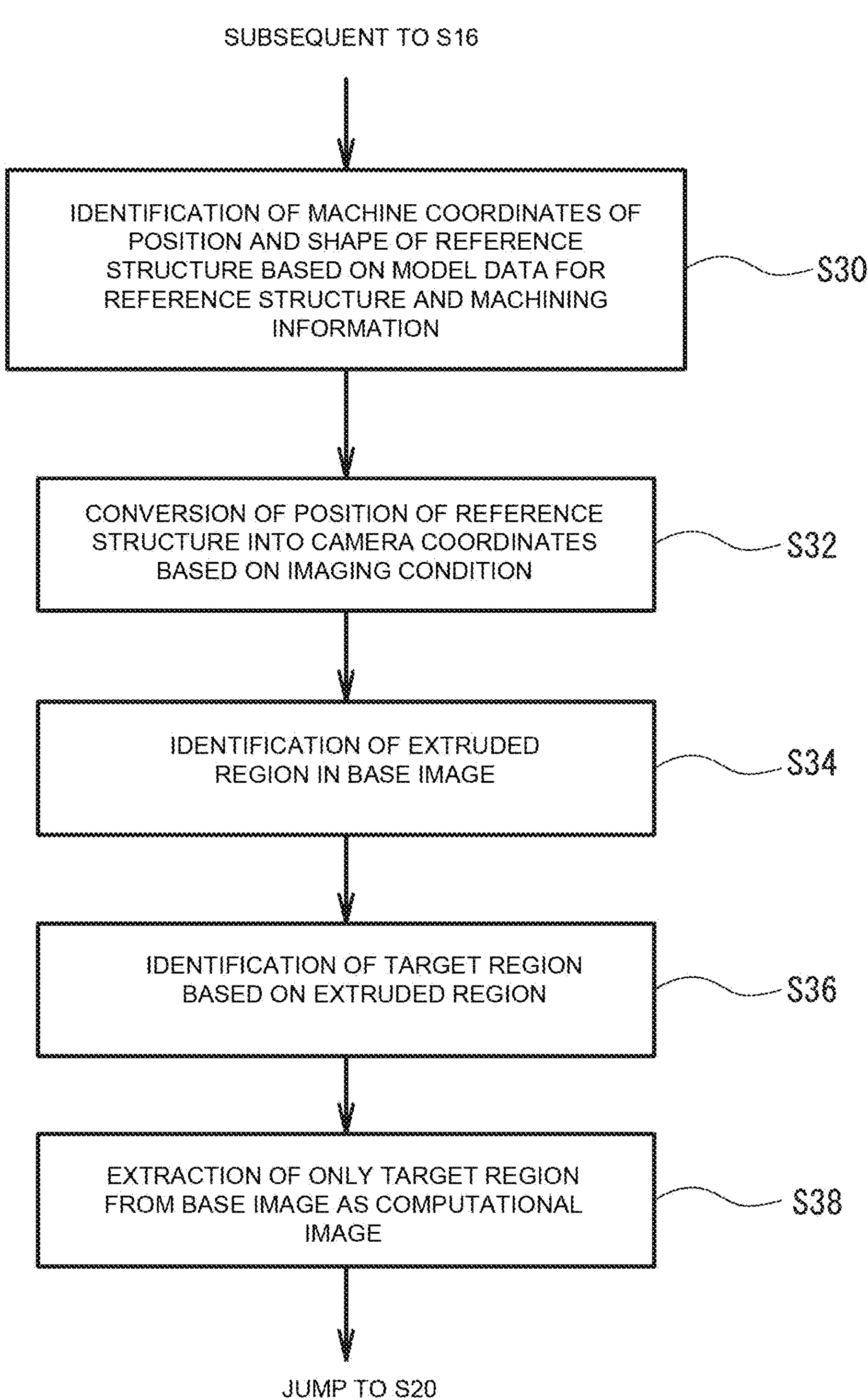
FIG. 11 is a flowchart showing a flow of process steps to generate the computational image.

Specifically, as shown in FIG. 11, the controller 12 identifies, based on both model data for the reference structure 52 and the machining information 66, machine coordinates of a position and a shape of the reference structure 52 (step S30). Then, the controller 12 converts, based on the imaging condition 70, the machine coordinates of the position of the reference structure 52 on the machine coordinate system into camera coordinates (step S32).

After the camera coordinates of the reference structure 52 are acquired, the controller 12 identifies an extruded region 56 in the base image 42 for each of one or more reference structures 52 (step S34). Further, the controller 12 identifies a target region 60 based on calculated one or more extruded regions 56 (step S36). More specifically, when one extruded region 56 has been identified, the controller 12 identifies the one extruded region 56 as the target region 60. On the other hand, when two or more extruded regions 56 have been identified, the controller 12 performs a logical operation to find a logical sum or a logical product of the two or more extruded regions 56 based on the extruding direction, and identifies as the target region 60 a region acquired by the logical operation.

Subsequent to the identification of the target region 60, the controller 12 extracts from the base image 42 only the target region 60 as a computational image 44 (step S38). When the computational image 44 can be extracted, the controller 12 moves to processing in step S20 shown in FIG. 10. In step S20, the controller 12 computes point cloud data 46 for the target object 40 from the i-th computational image 44. The calculated point cloud data 46 are temporarily stored in the memory 16 along with the imaging condition 70.

Next, the controller 12 compares the value of the parameter i and a numerical value imax (step S22). The numerical value imax is the number of imaging conditions 70 determined in step S12; i.e., the number of imaging directions. The numerical value imax is typically a natural number greater than or equal to 2. When a relationship of i<imax is found in the comparison, the controller 12 increments the value of the parameter i by one (step S24), and subsequently repeats processing in steps S16 to S22. On the other hand, when a relationship of i≥imax is found, the controller 12 merges imax sets of point cloud data 46 temporarily stored in the memory 16 (step S26), and subsequently generates model data 48 for the target object 40 (step S28).

As is evident from the above explanation, in this example, even when the imaging direction of imaging the base image 42 is changed, the reference structure 52 and the extruded region 56 used to generate the computational image 44 are not changed. For this reason, the operator is only required to specify the reference structure 52 or specify both the reference structure 52 and the extruding direction in step S10, which can lighten the operator labor required for generating a plurality of computational images 44.

The configuration and operation described above are presented merely by way of illustration and may be changed as appropriate other than the feature of computing one or more extruded regions 56 which are respectively formed by extruding one or more reference structures 52 along their corresponding extruding directions and cropping out a part of the base image 42 based on the one or more extruded regions 56, to thereby generate the computational image 44. For example, the reference structure 52 may be specified every time the imaging direction is changed. In the above-described example, the interior of the extruded region 56 is determined as the target region 60. Alternatively, the interior of the extruded region 56 may be determined as a region to be cropped out, and the exterior of the extruded region 56 may be determined as the target region 60.

The three-dimensional shape measuring system 10 may be used not only in combination of the machine tool 80, but also in combination of other devices. Alternatively, the three-dimensional shape measuring system 10 may be solely used rather than being combined with any device. Further, in the above description, the three-dimensional shape measuring system 10 has been explained as a separate system which is independent of the machine tool 80. Alternatively, the three-dimensional shape measuring system 10 may be integrated into the machine tool 80. For example, the controller 12 in the three-dimensional shape measuring system 10 may be implemented by the numerical control device 82 and the operation panel 84 in the machine tool 80, while the image capturing unit 30 may be attached to a retainer device disposed on the machine tool 80, rather than being attached to the tool 92 or the workpiece 90.

REFERENCE SIGNS LIST

10 three-dimensional shape measuring system, 12 controller, 14 processor, 16 memory, 18 model DB, 20 structure table, 22 communication I/F, 24 UI device, 30 image capturing unit, 32 camera, 34 light source, 40 target object, 42 base image, 44 computational image, 46 point cloud data, 48 three-dimensional shape data (model data), 52 reference structure, 56 extruded region, 57 logical-sum region, 60 target region, 66 machining information, 70 imaging condition, 80 machine tool, 82 numerical control device, 84 operation panel, 86 table, 88 vise, 90 workpiece, 92 tool, 94 spindle head, 96 cover.

The invention claimed is:

1. A three-dimensional shape measuring system, comprising:

a camera configured to image a target object to acquire a base image thereof, and a controller configured to measure a shape of the target object, wherein the controller is further configured to:

previously store three-dimensional shape data for a plurality of known structures, identify at least one structure from the plurality of known structures as at least one reference structure, compute, based on the three-dimensional shape data, at least one extruded region formed by extruding the at least one reference structure along at least one extruding direction which is respectively defined for the at least one reference structure in advance, crop out a part of the base image to generate a computational image based on the at least one extruded region and the base image, and measure the shape of the target object based on the computational image, and the controller is further configured to:

when the reference structure comprises one reference structure, identify the extruded region formed by the one reference structure as a target region, when the reference structure comprises a plurality of reference structures, identify, as the target region, a logical-sum region of extruded regions having mutually parallel extruding directions and a logical-product region of extruded regions having mutually orthogonal extruding directions, and crop out a region other than the target region from the base image, to generate the computational image.

2. The three-dimensional shape measuring system according to claim 1, wherein:

the at least one reference structure comprises a structure which is moved in conjunction with the target object, or a structure which is changed in position and orientation in conjunction with the target object.

3. The three-dimensional shape measuring system according to claim 1, wherein the controller is further configured to instruct the camera to image the target object under mutually-different imaging conditions in order to acquire a plurality of base images, and generate the computational image for each of the plurality of base images, and the controller is further configured to maintain the at least one reference structure and the at least one extruded region unchanged even when the imaging condition of the base image is changed, the at least one reference structure and the at least one extruded region being used to generate the computational image.

4. The three-dimensional shape measuring system according to claim 1, wherein an imaging direction for the base image is always set to a direction parallel to or orthogonal to one of the at least one extruding direction.

5. The three-dimensional shape measuring system according to claim 1, wherein the at least one reference structure comprises a target object attachment device to which the target object is attached, and a direction along which the target object is attached to the target object attachment device is defined as an extruding direction for the target object attachment device.

6. The three-dimensional shape measuring system according to claim 5, wherein the controller is configured to:

generate three-dimensional shape data for the target object based on the computational image, previously store, in association with the target object attachment device, a property corresponding to a characteristic feature of the target object which is attached to the target object attachment device, and when the target object attachment device is selected as the reference structure, assign the property associated with the target object attachment device to the three-dimensional shape data for the target object.

* * * * *